United States Patent Office 2,740,647
Patented Apr. 3, 1956

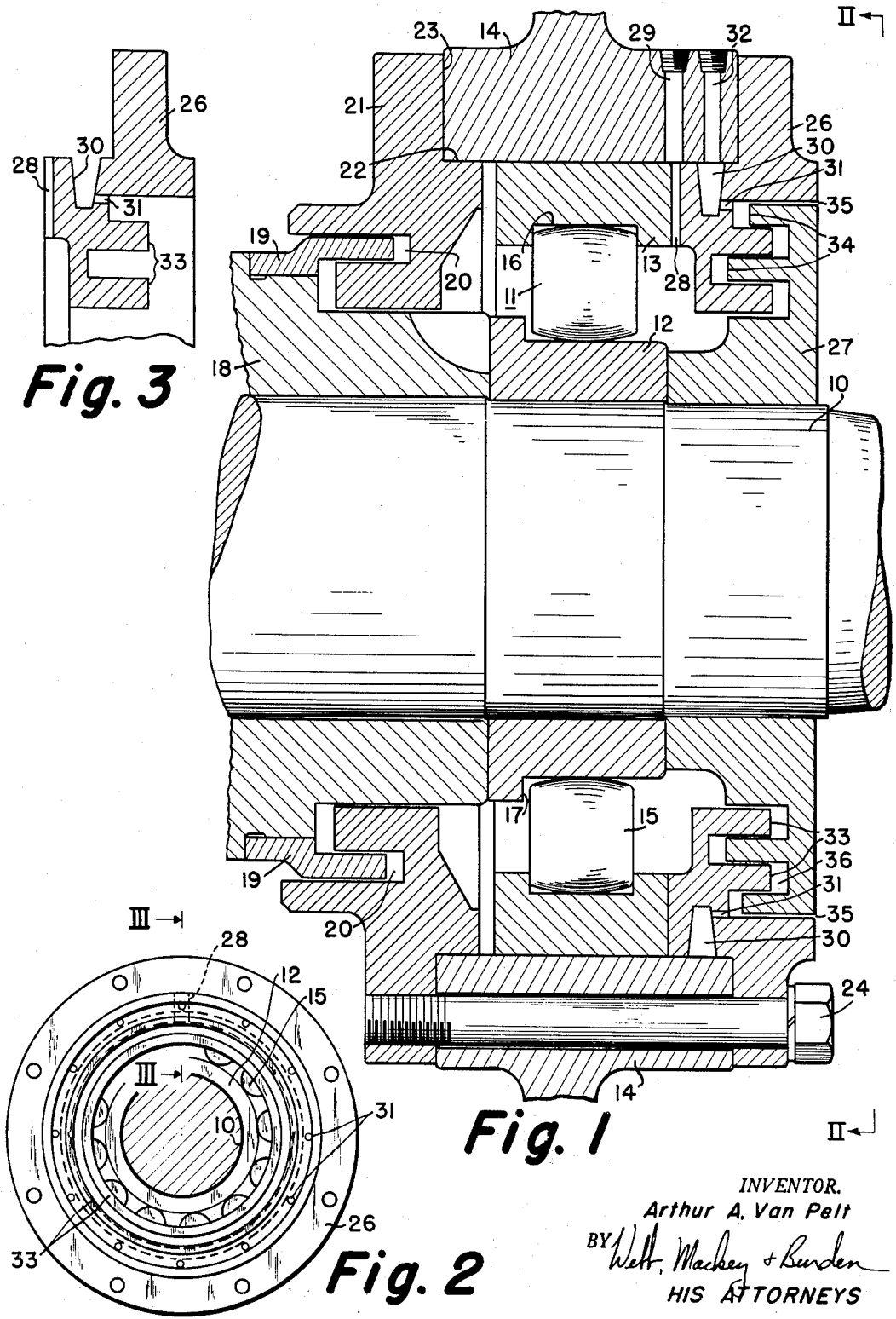

2,740,647
BEARING CONSTRUCTION

Arthur A. Van Pelt, Pittsburgh, Pa.

Application October 7, 1952, Serial No. 313,429

2 Claims. (Cl. 286—10)

This invention relates to an improved bearing construction.

The use of bearings to minimize friction between parts which move relative to each other is well known in the art. It is the practice periodically to inject a lubricant such as oil or more often grease in and about the bearing areas further to reduce the friction of the moving parts, for example, the friction between the rollers of the bearing and its races. To this end suitable ports are usually provided in the bearing construction leading to the areas to be lubricated and an injection gun employed to advance a lubricant under pressure through the ports and into those areas.

A serious problem often develops in that dirt and other foreign matter and particularly dust, lint, and other contaminating particles present in the air have equal access to the mentioned lubricating ports. Aided at least in part by the sticky nature of oil and grease, these contaminating particles are readily picked up and work or seep their way with the lubricant through the ports into the lubricated areas where, because of their collective abrasive nature, they scourge the walls of the moving parts or otherwise interfere with satisfactory operation. This problem is greatly magnified when the bearing is used in industrial areas under extreme dusty conditions where the air is heavily laden with many sorts of contaminating particles.

I provide a bearing which has a tight seal around the moving parts thereby preventing as much contaminating matter as possible from reaching the bearings. I also provide means for forcing out of the bearing such foreign matter as may have started to work into the bearing before such matter reaches the moving parts.

One form of the invention is shown by the drawing wherein:

Figure 1 is an axial section of a bearing construction embodying the present invention;

Figure 2 is a section of the construction shown in Figure 1 taken on the line II—II with the outer flange or ring removed for clearness of illustration; and Figure 3 is a partial section of Figure 2, taken on the line III—III.

Referring to the figures, the bearing construction includes a shaft or axle member 10 having a progressively narrower diameter at one end to accommodate various parts hereafter disclosed and to aid in preventing their lateral movement. A bearing, for example, indicated generally at 11 has an inner race 12 contacting the axle 10, an outer race 13 contacting a member 14, a hub for example, and roller bearings 15 between the races. The outer race has a central recess 16 shaped to fit the length of the roller bearings and prevent their side movement. The inner race 12 has a side rim 17 to prevent lateral mass movement of the bearings and outer race as a whole past that point.

The race 12 and the member 14 are expanded by heat and then cooled to shrink those parts in position on the axle and race 13, respectively. The member 14, of which only a portion is here shown, is any suitable part designed for movement relative to the axle 10. Also, although roller bearings are shown, ball bearings or tapered bearings may also be used.

The inner race 12 is suitably buttressed on one side by a collar 18, which may also be shrunk onto the axle 10. This collar has a rim insert 19, preferably of a harder material, which mates with an annular slot 20 in the flange 21. The latter has seats 22 and 23 to receive the member 14 and may be joined thereto by any convenient means, for example, by the bolt 24.

The other side of the bearing is sealed by a protective cover which illustrates novel features of the present invention. The cover consists of two flanges or rings 26 and 27. The inner flange 26 is also secured to the member 14 by the bolt 24 and contacts a side face of the outer race 13. The flange 26 is further provided with a radial opening 28 which registers with a larger opening 29 in the member 14. It is through these aligned openings that a lubricant such as grease may be quickly introduced into the bearing construction when it is desired to pack the bearing.

More important, the flange 26 is also provided with a peripheral groove 30 which communicates with the other side of the flange 26 and with an area yet to be described by a plurality of substantially axially extending passages 31. The groove 30 connects with an opening 32 in the member 14 which is similar to the opening 29.

The side of flange 26 away from the bearing includes superposed protruding rings or ridges 33. These rings are concentric to the axle 10 and extend axially away from the bearing. The passages 31 reach this side of the flange 26 preferably above the outermost ring or ridge.

The second flange or ring 27 of which the protecting cover is composed is of the nature of a retaining ring and has a press fit about the axle 10 which may be slightly tapered at this point to provide a tight fit. The flange 27 contacts a side face of the inner race 12 and also has superposed protruding rings or ridges 34 which are concentric with the axle 10. These ridges, however, extend axially toward the bearing 11 and are offset from those of flange 26. In this manner, the ridges 33 and 34 intermesh to form a serpentine, circuitous path therebetween from the outside of the assembly to the roller bearing. The passages between the curved surfaces of adjacent ridges and particularly the passage 35 opening to the atmosphere are preferably quite thin.

In an initial operation, the bearing construction is assembled except for the flanges 26 and 27 which are packed with a lubricant such as grease, particularly about the ridges 33 and 34. These flanges are then fitted together and placed next to the bearing as shown, the flange 27 having a press fit about the axle 10. Thereafter, additional lubricant is forced through the opening 29 down into the bearing proper. At the same time, if desired, a further charge of lubricant may be introduced through the opening 32 to fill any areas void of lubricant from the opening 32 to the intermeshing ridges 33 and 34. Thereafter, if desired, threaded plugs (not shown) may be screwed into the tapped and threaded entrances of the openings 29 and 32. After a certain period of operation, depending on the conditions of use, the lubricant adjacent the atmospheric opening 35 becomes contaminated with dirt as previously explained. When this occurs, it is necessary only to remove the plug to the opening 32, if used, and add a further charge of lubricant under very high pressure as from an injection gun.

Because of the abrupt right angle bends and narrow passages formed by the ridges 33 and 34 of the flanges 26 and 27, the lubricant even though under high pressure does not work through the passages much beyond the point designated 36. This is also because the thin passage 35 is open to the atmosphere. Consequently, a lubricant supplied through the passage 32 tends to exit through the thin passage 35 after it has reached approximately the point designated 36. As a result, any dirt which has seeped its way along the passage 35 is flushed out when the lubricant under pressure is supplied to the passage 32. If the bearings are greased frequently, the dirt and any other foreign matter are continuously flushed out of the passage 35 before the dirt has an opportunity to work into the bearing and inflict any damage.

The frequency of the flushing step may be daily, weekly, or at whatever times the frequency and condition of use of the bearing construction dictates, the primary concern being only that the flushing occurs before the dirt penetrates past the area served by that step.

It will now be apparent that the present invention provides an improved bearing construction. Further, lubricated areas of the instant bearing construction are continuously free of a contaminated lubricant. Any lubricant that does become contaminated is relatively remote from the bearing surfaces being lubricated, and still further, is simply and easily removed, as explained, before inflicting damage.

Various changes and modifications may be made in the present invention within the spirit and scope of the appended claims.

I claim:

1. In a bearing construction having a fixed member, a rotating member and a bearing between the members, a seal for the bearing comprising two circular flanges concentric with the axis of rotation and adjacent the bearing, one flange being attached to the fixed member and the other flange being attached to the rotating member, said flanges being positioned adjacent each other and having opposed axially extending portions which intermesh and form an elongated serpentine passage leading from atmosphere to the bearing and providing for the restricted flow of lubricant therethrough and a second passage for supplying lubricant to the first passage, said second passage being connected to the first passage at a point between the ends of the first passage where resistance to the flow of lubricant through the first passage towards atmosphere is less than the resistance to the flow of lubricant through the first passage towards the bearing.

2. In a bearing construction having a fixed member, a rotating member and a bearing between the members, a seal for the bearing comprising two circular flanges concentric with the axis of rotation of said rotating member and positioned adjacent said bearing, one flange being attached to the fixed member and one flange being attached to the moving member, said flanges having circular ridges which extend axially from each flange towards the other flange and intermesh with each other to form a serpentine passage leading from atmosphere to the bearing and providing for the restricted flow of lubricant therethrough, and a second passage for supplying lubricant to the first passage, said second passage being connected to the first passage at a point between the ends of the first passage where lubricant under pressure from said second passage will flow through the first passage to atmosphere, but will not flow through the first passage towards the bearing a sufficient distance to reach the bearing.

References Cited in the file of this patent

UNITED STATES PATENTS

| | | |
|---|---|---|
| 1,187,212 | Westinghouse | June 13, 1916 |
| 1,749,281 | Hambleton | Mar. 4, 1930 |
| 1,985,063 | Simpson | Dec. 18, 1934 |
| 2,032,817 | Svenson | Mar. 3, 1936 |
| 2,304,198 | Overstrom et al. | Dec. 8, 1942 |
| 2,431,446 | Anderson | Nov. 25, 1947 |
| 2,473,513 | Dewey | June 21, 1949 |